United States Patent [19]

Greene

[11] 4,221,763
[45] Sep. 9, 1980

[54] MULTI TUBE HIGH PRESSURE, HIGH TEMPERATURE REACTOR

[75] Inventor: Marvin I. Greene, Somerset, N.J.

[73] Assignee: Cities Service Company, Tulsa, Okla.

[21] Appl. No.: 937,891

[22] Filed: Aug. 29, 1978

[51] Int. Cl.² .............................................. B01J 3/00
[52] U.S. Cl. .................................... 422/197; 165/83;
165/158; 422/201; 422/241; 422/242
[58] Field of Search ............... 422/196, 197, 200, 201,
422/241, 242, 312; 165/83, 158

[56] References Cited

U.S. PATENT DOCUMENTS

| | | | |
|---|---|---|---|
| 2,263,363 | 11/1941 | Menshih | 422/197 |
| 2,970,042 | 1/1961 | Lagerwey | 422/241 |
| 3,008,811 | 11/1961 | Brumbaugh et al. | 422/241 |
| 3,183,967 | 5/1965 | Mettenleiter et al. | 165/83 |
| 3,419,362 | 12/1968 | Chevion | 422/197 |
| 3,469,944 | 9/1969 | Bocard et al. | 422/196 X |
| 3,482,947 | 12/1969 | Jacobsen et al. | 261/112 X |
| 3,850,231 | 11/1974 | Creek | 165/83 |
| 3,918,917 | 11/1975 | Ashina et al. | 422/197 |

Primary Examiner—Arnold Turk
Attorney, Agent, or Firm—George L. Rushton; Richard S. Strickler

[57] ABSTRACT

A high pressure, high temperature reactor device having a pair of spaced tube sheets for supporting a tube nest, one tube sheet being formed with a bellows to compensate for expansion and contraction of the tube nest longitudinally during temperature changes and the second tube sheet supporting the opposite end tubes of the tube nest, with injector tubes mating with each reactor tube and projecting through the reactor shell.

1 Claim, 1 Drawing Figure

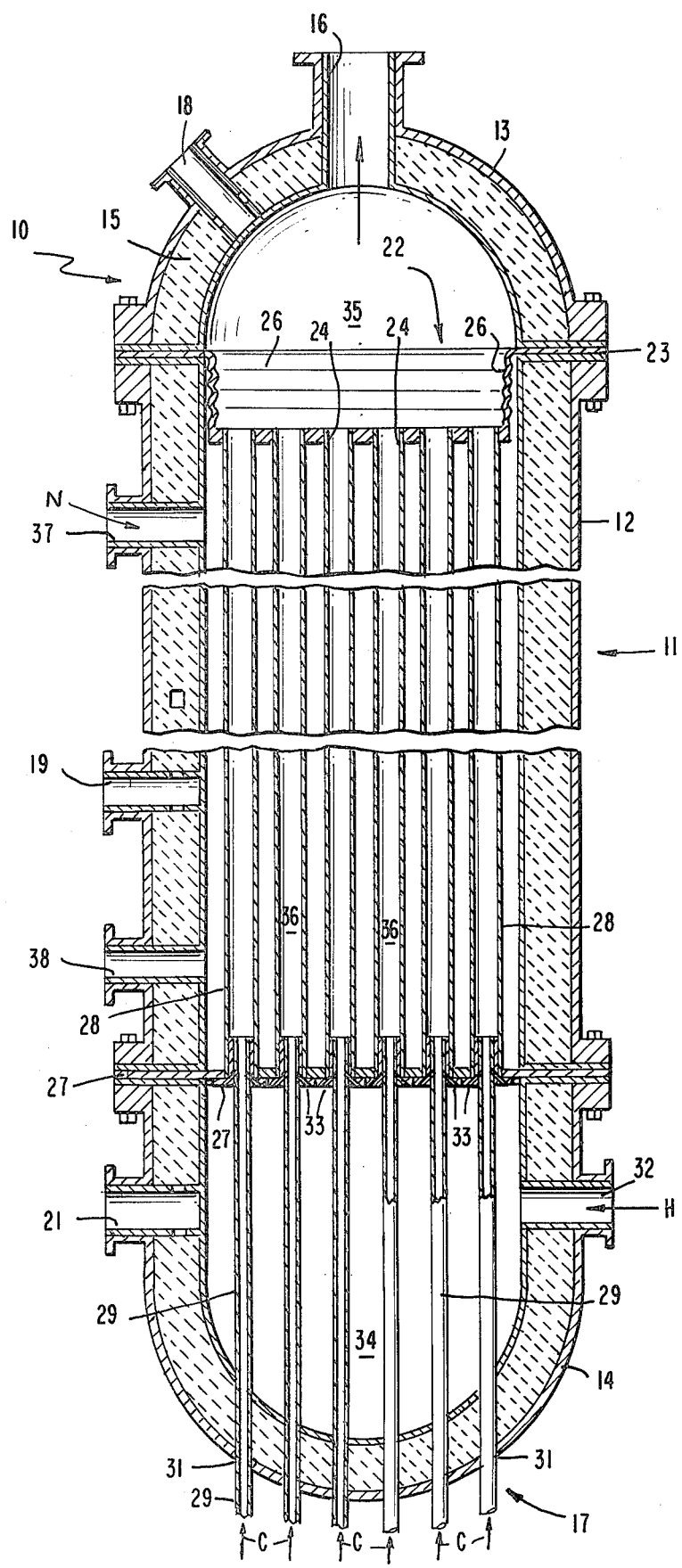

MULTI TUBE HIGH PRESSURE, HIGH TEMPERATURE REACTOR

BACKGROUND OF THE INVENTION

The present invention relates to reactors and, in particular, to high temperature, high pressure reactors useful to carry out processes such as disclosed and described in U.S. Pat. No. 3,960,700, issued June 1, 1976, to Rosen et al., entitled "Coal Hydrogenation to Produce Liquids".

The Rosen et al. process converts hydrogen and coal to gas, benzene and char while the residence time of the coal in the reactor is less than two seconds.

Representative prior art reactors are illustrated and described in U.S. Pat. Nos. 4,042,334, issued Aug. 16, 1977 and 4,044,117, issued Aug. 23, 1977 to Edwin Matovich.

BRIEF DESCRIPTION OF THE INVENTION

A particular feature of the invention is the provision of a pressure vessel or reactor which involves low risk in scale-up from pilot size to commercial size.

A further feature of the invention is the provision of a reactor which houses a plurality of reactor tubes supported on each end in tube sheets.

A further feature of the invention is the provision of a reactor structure having enhanced heat transfer characteristics to and from the interior of the tubes.

A further feature of the invention is the provision of a pressure balance between the reaction medium within the tubes and the heat transfer medium surrounding the tubes, thereby precluding collapse or rupture of the tube walls.

A still further feature of the invention is the provision of a plurality of paths for positive movement of reaction material along unobstructed or straight through paths, precluding eddy currents, bridging a quiescent zones commonly encountered in single tube reactors.

A further feature of the present invention is the provision of a multi path (multi tube) reactor providing the operator the option of using all or some of the tube paths, in one combination or another, so that idle or inoperative paths do not interfere with overall reactor operation.

A further feature of the invention is the provision of a high pressure, high temperature reaction vessel which by virtue of its internal tube bundle structure in combination with the maintenance of couner-balancing pressures within and without the tubes, provides economies in that the shell of the reactor is the only element that need be fabricated of high strength steel.

A representative embodiment of the reactor of the present invention may comprise a generally cylindrical body having opposed ends, each end of said body being closed by separable hemispherical caps, said body and caps defining a pressure shell having an inlet and a discharge end, a refractory liner in areal contact with the interior of the pressure shell, an expandable tube sheet secured to the pressure shell at the discharge end for supporting one end of a plurality or nest of reactor tubes, a second tube sheet fixed to the shell at the inlet end for supporting the opposite ends of said tubes, injector tubes mating with each reactor tube projecting through the pressure shell at the inlet end and making a fluid type connection with mating tubes and the pressure shell, conduit means providing an inlet and an outlet to and from the pressure shell to provide for circulation of heat transfer material within the pressure shell between the tube sheets and around and about the exterior of the tubes, a second conduit means communicating with the refractory liner to provide for the introduction of inert gases permeating the refractory liner to block undesireable gaseous media to and from the refractory, a reaction material inlet communicating with the interior of the inlet cap and communicating with the interior of each reaction tube through said second tube sheet whereby reaction material, such as hydrogen, introduced into the tubes will react with reaction material, such as coal, introduced through said injector tubes with the result that products of the reaction are advanced through the tube nest and are discharged from the reactor outlet.

Other features and advantages of the present invention will become more apparent from an examination of the succeeding specification when read in conjunction with the drawings; in which: a single FIGURE shows a vertical section of a reactor illustrating basic features of the invention.

BRIEF DESCRIPTION OF THE DRAWINGS

Reference numeral 10 indicates generally a high pressure, high temperature reactor having a pressure shell 11 comprising a cylindrical body 12 and separable caps 13 and 14.

The cap 13 is provided with a reactor outlet 16 and the opposite end defines outlet 17.

The interior of the shell is lined with refractory 15 and conduits 18, 19 and 21 are provided for introduction of inert gas and for maintaining a head of pressure of said gas within the refractory to preclude transfer of undesireable gases to and from the refractory.

An expandable tube sheet indicated generally by the reference numeral 22 is supported by the pressure shell as shown at 23. The tube sheet 22, providing support for a plurality of reactor tubes 24—24, is formed with a corrugated collar or bellows 26 to facilitate expansion and contraction of the tube bundle longitudinally. A second tube sheet 27, fixed to the opposite end of the reactor vessel, supports the opposite ends 28—28 of the reator tubes and provides a fluid tight joint and support for mating injector tubes 29—29.

Note that the injector tubes make a fluid tight seal with the pressure shell as shown at 31—31.

The reactor shell is formed with an inlet 32 defining an inlet for a reaction medium or material H. Correspondingly, the injectors 29—29 are inlets for a second reaction medium or material as indicated by the letter C.

Note that tube sheet 27 is formed with a plurality of openings 33—33, providing communication from chamber 34 to the interior 36—36 of each reaction tube, permitting reaction material H to co-mingle and react with reaction medium C with the result that products of the reaction within the tubes are discharged into chamber 35 and thence, through outlet 16 to suitable collectors or other process apparatus not shown.

Heat transfer material N, introduced through inlet 37, is circulated about the exterior of reaction tubes 24—24 between tube sheets 22 and 27 and is discharged through outlet 38.

The pressure of the reactants within the tubes is counter balanced by the pressure of the heat transfer medium surrounding the tubes, thereby precluding collapse or rupture of the tubes. In this arrangement, the requirement for high strength tube material is eliminated.

It is further noted that the principal high strength material is the cylinder 11 and cooperating hemispherical closures 13 and 14.

It is anticipated that a wide variety of modifications may be developed in the disclosed embodiment of the present invention without departing from the spirit and scope thereof.

I claim:

1. A reactor device comprising a generally cylindrical body having opposed ends, each end of said body being closed by separable hemispherical caps, said body and caps defining a pressure shell having an inlet end and a discharge end, a refractory liner in areal contact with the interior of the pressure shell, a plurality or nest of reactor tubes, an expandable tube sheet secured to the pressure shell at the discharge end for supporting one end of said plurality or nest of reactor tubes, a second tube sheet fixed to the shell at the inlet end for supporting the opposite ends of said tubes, injector tubes mating with each reactor tube projecting through the pressure shell at the inlet end and making a fluid tight connection with mating tubes and the pressure shell, conduit means providing an inlet and an outlet to and from the pressure shell to provide for circulation of heat transfer material within the pressure shell between the tube sheets and around and about the exterior of the tubes, a second conduit means communicating with the refractory liner to provide for the introduction of inert gases permeating the refractory liner to block undesireable gaseous mediums to and from the refractory, a reaction material inlet communicating with the interior of the inlet cap and communicating with the interior of each reaction tube through said second tube sheet whereby reaction material, introduced into the tubes, will react with other reaction material, introduced through said injector tubes with the result that products of the reaction are advanced through the tube nest and are discharged from the reactor outlet.

* * * * *